J. B. FISCHER.
WEEDLESS FISHING HOOK.
APPLICATION FILED OCT. 20, 1913.

1,124,719.

Patented Jan. 12, 1915.

Witnesses:
John Enders
Henry Mor.

Inventor:
Joseph B. Fischer,
by Robert Burns
Atty.

ively coupled portions of the float halves, and a spring acting on the pivotally coupled float halves to normally hold them in a position in which the fish-hook is masked by the other of said float halves, substantially as set forth.

UNITED STATES PATENT OFFICE.

JOSEPH B. FISCHER, OF CHICAGO, ILLINOIS, ASSIGNOR OF ONE-HALF TO FRANK J. FISCHER, OF CHICAGO, ILLINOIS.

WEEDLESS FISHING-HOOK.

1,124,719.  Specification of Letters Patent.  Patented Jan. 12, 1915.

Application filed October 20, 1913. Serial No. 796,117.

*To all whom it may concern:*

Be it known that I, JOSEPH B. FISCHER, a citizen of the United States of America, and a resident of Chicago, in the county of Cook, State of Illinois, have invented certain new and useful Improvements in Weedless Fishing-Hooks, of which the following is a specification.

This invention relates to weedless fishing hooks, and more especially to the trolling and casting types of such hooks, and has for its object to provide a simple and efficient structural formation and combination of parts whereby the barbed points of a pair of opposed hooks are efficiently masked or guarded until such time as the jaws of a fish close upon the bait, when the barbed points are automatically unmasked to engage within the mouth of the fish, to hold the same, all as will hereinafter more fully appear.

Figure 1:
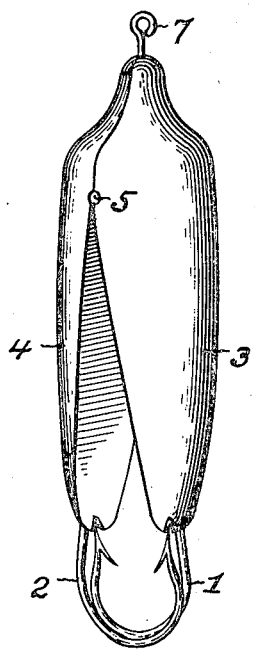
Figure 2:
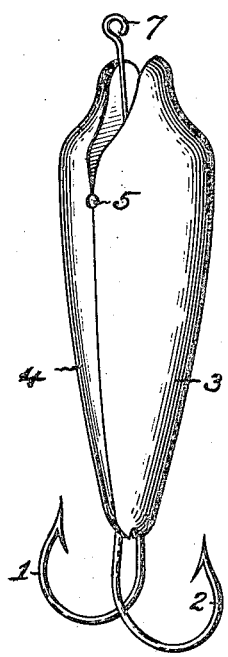
Figure 3:
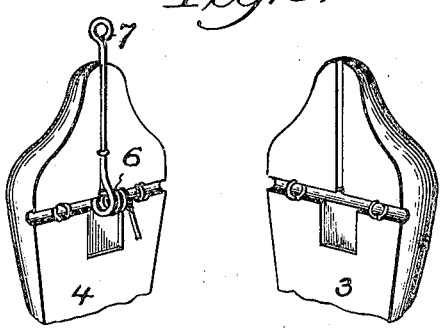

In the accompanying drawings: Figure 1, is a perspective view of the preferred form of the present weedless fishing appliance in the normal masked condition of the hooks. Fig. 2, is a similar view, showing the unmasked position of the hooks. Fig. 3, is a detached perspective view, illustrating the preferred arrangement of the pivot pintle, spring, etc.

Similar reference numerals indicate like parts in the several views.

Referring to the drawings, 1 and 2, represent a pair of counterpart fish hooks, the free and barbed ends of which are arranged in opposed relation so that in their ordinary and normal position, the body of one hook will mask or guard the barbed point of the other hook, and vice versa, as illustrated in Fig. 1. Such normal position of the parts is yieldingly attained by a pivotal connection of any usual form between the shank portions of the fish hooks, a coacting spring and stop to limit the pivotal movement between the parts, and preferably the special construction shown in the drawings and now to be described.

3 and 4 are counterpart sections or pieces of any suitable and desired shape, and which are rigidly secured to the respective shanks of the fish hooks 1 and 2, so as to carry the same.

5 is a pivot pintle connecting the sections 3 and 4 together, preferably at a point distant from the ends of said sections at which the hooks are secured, and with a view to render the operation of the appliance very sensitive in actual use.

6 is a coiled spring surrounding the pintle 5 and having bearings against the contacting faces of the sections 3 and 4, with a yielding tendency to hold said sections in the position illustrated in Fig. 1, with the barbed ends of the fishing hooks 1 and 2, in the guarded or masked position above described. In the preferred construction shown, one end of the spring 6 is extended out past the ends of the sections 3 and 4, and provided with an eye 7 for the convenient attachment of a fishing line.

In the preferred form of the present invention the contacting faces of the sections or pieces 3 and 4 are beveled in opposite directions from their point of pivotal connection above described, and so as to permit a limited degree of pivotal movement between the sections, and constitute stops to prevent too great a movement in either direction.

Where the appliance is intended for deep fishing, the sections 3 and 4, may be made heavier than water so as to constitute a sinker for the appliance, but in that the appliance is more especially intended for casting and trolling fishing, the said sections will be made of any ordinary buoyant material, to constitute a floating bait or appliance for such class of fishing.

In use the spring 6 will yieldingly maintain the barbed points of the fishing hooks 1 and 2 in the masked or guarded position shown in Fig. 1, in which position the appliance can be used among sunken tree tops, brush, lily pads, bullrushes, snags, stones or weeds, without any liability to catching on to said objects. When, however, the jaws of a fish close upon the bait, the ends of the sections 3 and 4, carrying the hooks 1 and 2, are pushed together against the stress of the spring 6, and the barbed points of said hooks 1 and 2 are unmasked to catch in the mouth of the fish, and finally assume the position illustrated in Fig. 2.

Having thus fully described my said invention what I claim as new and desire to secure by Letters Patent, is:—

1. An artificial bait, comprising a float formed of two float halves pivoted together intermediate their length, a line attaching means associated with one end of the float, a fish-hook attached to one of the float-halves and extending beyond the end of said float-half opposite to the line attaching means and with the barbed end of said fish-hook associated with the end of the companion float-half and masked thereby, and means for yieldingly holding the float-halves in position in which the barbed end of the fish-hook is in a masked condition.

2. An artificial bait, comprising a float formed of two float-halves pivoted together intermediate their length, a line attaching means associated with one end of the float, fish-hooks individually attached to the float-halves and extending beyond the ends of the same opposite the line attaching means and with the barbed end of each fish-hook associated with the end of the companion float-half and masked thereby, and means for yieldingly holding the float-halves in position in which the barbed end of the fish-hooks are in masked condition.

Signed at Chicago, Illinois, this 16th day of October, 1913.

JOSEPH B. FISCHER.

Witnesses:
 ROBERT BURNS,
 WILLIAM L. PERRY.